United States Patent
Czotscher et al.

(10) Patent No.: US 7,904,519 B2
(45) Date of Patent: Mar. 8, 2011

(54) METHOD FOR SWITCHING BETWEEN EMBEDDED COMMUNICATIONS AND EXTERNAL COMMUNICATIONS

(75) Inventors: Konrad Czotscher, Nuremberg (DE); Siegfried Gronbach, Bubenreuth (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 752 days.

(21) Appl. No.: 11/358,679

(22) Filed: Feb. 21, 2006

(65) Prior Publication Data

US 2007/0208814 A1   Sep. 6, 2007

(51) Int. Cl.
*G06F 15/16* (2006.01)

(52) U.S. Cl. ......... 709/206; 709/230; 709/227; 709/249; 709/250; 370/91; 370/466; 370/227

(58) Field of Classification Search .................. 709/228, 709/227, 230–237, 245, 206, 249–250; 370/466, 370/402, 95, 85, 465, 469, 400, 91–94, 230, 370/313, 227
See application file for complete search history.

(56) References Cited

U.S. PATENT DOCUMENTS

| | | | | |
|---|---|---|---|---|
| 4,584,680 A * | 4/1986 | Carter et al. | ................ | 370/360 |
| 5,086,426 A * | 2/1992 | Tsukakoshi et al. | .......... | 370/405 |
| 5,151,782 A * | 9/1992 | Ferraro | ........................... | 725/66 |
| 5,452,302 A * | 9/1995 | Lewis | ........................... | 370/449 |
| 6,130,917 A * | 10/2000 | Monroe | ........................ | 375/295 |
| 6,167,450 A * | 12/2000 | Angwin et al. | ................ | 709/227 |
| 6,259,706 B1 * | 7/2001 | Shimada | ........................ | 370/466 |
| 6,344,914 B1 * | 2/2002 | Shimojoh et al. | ................ | 398/17 |
| 6,344,915 B1 * | 2/2002 | Alexander et al. | ............ | 398/115 |
| 6,400,729 B1 * | 6/2002 | Shimadoi et al. | .............. | 370/466 |
| 6,601,115 B1 * | 7/2003 | Yonezawa et al. | ............... | 710/11 |
| 6,771,751 B1 * | 8/2004 | Kasturi et al. | ............ | 379/93.27 |
| 6,879,826 B2 * | 4/2005 | Muramatsu | .................... | 455/423 |
| 2002/0105968 A1 * | 8/2002 | Pruzan et al. | .................. | 370/465 |
| 2003/0056043 A1 * | 3/2003 | Kostadinov | ................... | 710/104 |
| 2005/0021874 A1 * | 1/2005 | Georgiou et al. | ............. | 709/250 |
| 2007/0143488 A1 * | 6/2007 | Pantalone | ..................... | 709/230 |

* cited by examiner

*Primary Examiner* — Wing F Chan
*Assistant Examiner* — Benjamin M Thieu
(74) *Attorney, Agent, or Firm* — Wall & Tong, LLP

(57) ABSTRACT

The invention includes a method for processing messages at a component. One method includes receiving a message formed according to an embedded protocol or an external protocol, processing a portion of the received message for identifying the protocol used to form the message, and processing the received message using the identified protocol. The portion of the received message is formed using a comparison between at least one characteristic associated with the embedded protocol and at least one characteristic associated with the external protocol. Another method includes receiving, at a first type-one component, a message from one of a second type-one component or a type-two component, processing a portion of the message for identifying a protocol adapted for processing the received message, and processing the received message using the identified protocol.

17 Claims, 6 Drawing Sheets

METHOD FOR SWITCHING BETWEEN EMBEDDED COMMUNICATIONS AND EXTERNAL COMMUNICATIONS

FIELD OF THE INVENTION

The invention relates to the field of communication networks and, more specifically, to message protocol selection.

BACKGROUND OF THE INVENTION

In general, embedded systems (e.g., telecommunications systems) are designed utilizing distributed processing power. Specifically, processing modules (e.g., microcontrollers, digital signal processors, and the like) communicate using dedicated messages and a given command set (referred to as embedded communication). In certain systems, the communicated commands are binary encoded for minimizing communication-processing overhead. In some systems, in addition to supporting embedded communication, processing modules include additional interfaces for communicating using other command sets. For example, processing modules may include additional interfaces supporting additional ASCII-based command sets (referred to as ASCII communication) which allow human-intuitive communication.

In order to process commands, controllers in existing systems utilize a dedicated command within each command set for switching the processing module to the associated command set. For example, embedded command "0xFF" may be used for switching controllers from the embedded command set to the ASCII command set, and ASCII command "EMB-COM" may be used for switching processing modules from the ASCII command set to the embedded command set. As such, disadvantageously, switching between command sets requires explicit application of the dedicated command and, if a command from an inactive command set is received (e.g., an ASCII command is received when the processor is set to process embedded commands), the controller cannot recognize the received command, often leading to undesirable system behavior.

SUMMARY OF THE INVENTION

Various deficiencies in the prior art are addressed through the invention of a method for processing messages at a component. In one embodiment, a method includes receiving a message formed according to an embedded protocol or an external protocol, processing a portion of the received message for identifying the protocol used to form the message, and processing the received message using the identified protocol. The portion of the received message is formed using a comparison between at least one characteristic associated with the embedded protocol and at least one characteristic associated with the external protocol. In another embodiment, a method includes receiving, at a first type-one component, a message from one of a second type-one component or a type-two component, processing a portion of the message for identifying a protocol adapted for processing the received message, and processing the received message using the identified protocol.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables computer modules to switch between communication protocols without requiring processing of explicit commands for switching between the communication protocols, thereby reducing communication overhead. The present invention uses communication protocol information within communication protocol messages exchanged between computer modules (i.e., information enabling computer components to identify the communication protocol associated with the exchanged communication protocol messages) to select the appropriate protocol. At least a portion of the message serves two functions; namely, selection of the communication protocol and conveying information to be processed using the selected protocol. The present invention enables the computer modules to switch between communication protocols without using a message header for switching between the communication protocols, further reducing communication overhead.

In general, a communication protocol includes a set of rules for representing, conveying, and processing information, as well as performing like functions, as well as various combinations thereof, for supporting communication between computer components. In general, communication between computer components may include exchanging of messages, commands, data, and the like, as well as various combinations thereof in support of various functions, applications, and the like. In embodiments of the present invention, the term "communication protocol" may be broadly interpreted to encompass various other processing rules, data structures, and the like (e.g., message formats, message sets, command formats, command sets, encoding and decoding functions, and the like), as well as various combinations thereof, for supporting communication between computer components.

The present invention obviates the need to generate and transmit a separate command for selecting a protocol, or devote a portion of each message for supporting a header to convey information for selecting a protocol, in order to switch between communication protocols. As such, the present invention obviates the need for computer components to search command sets for identifying and processing explicit messages adapted for switching between communication protocols. Furthermore, by preventing computer components from failing to recognize messages while configured for processing messages associated with different communication protocols (i.e., different than the communication protocol associated with the received messages), the present invention thereby improves communication between computer components (e.g., reduces message processing overhead, reduces message processing errors, and the like).

Figure 1:
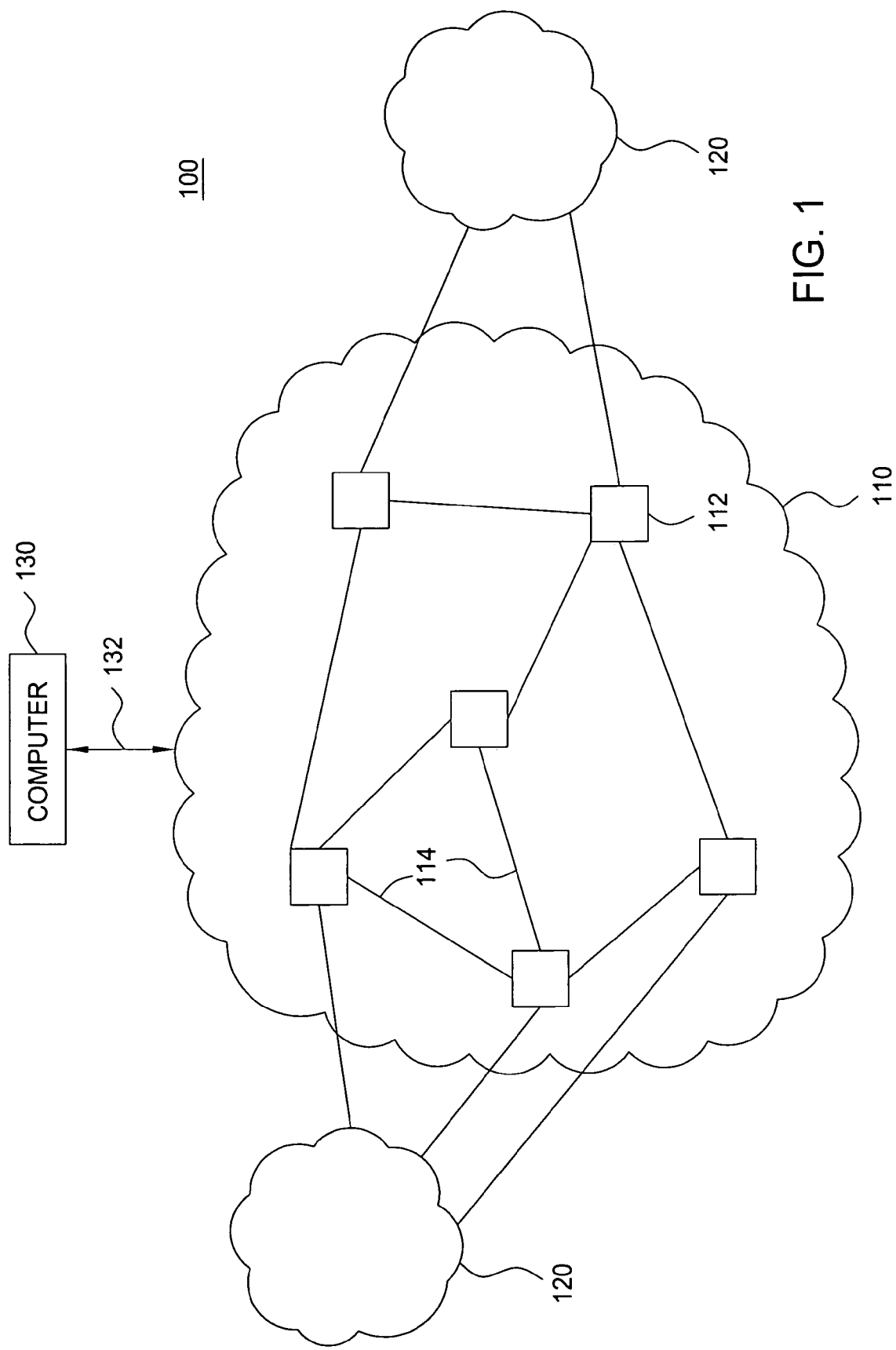
FIG. 1 depicts a high-level block diagram of a communication network.

FIG. 1 depicts a high-level block diagram of a communication network. As depicted in FIG. 1, communication network 100 includes a core network 110 and a plurality of access networks 120 (collectively, access networks 120). The core network 110 includes a plurality of network elements 112 (collectively, network elements 112) communicating using a plurality of communication links 114 (collectively, communication links 114). The core network enables communication between access networks 120 (which operate as network interfaces for enabling communications between network endpoints (not depicted)). For purposes of clarity by example, communication network 100 is depicted and described herein as an optical transport network. Although depicted and described as an optical transport network, the present invention may be implemented in any network.

As depicted in FIG. 1, communication network 100 includes a computer 130 (i.e., any computer operable for communicating with network elements 112) in communication with core network 110 using a communication link 132. The computer 130 may include various processors, memory, and other components for performing functions such as traffic monitoring, alarm processing, and the like. Furthermore, computer 130 may further include user interaction devices (e.g., keyboards, display terminals, and the like), thereby enabling users to interact with network elements 112 for performing functions such as remote network element configuration, remote network element maintenance, and the like, as well as various combinations thereof. For example, computer 130 may include a management system (e.g., a provisioning management system, a fault management system, and the like) operable for controlling at least a portion of the network elements 112. The computer 130 may perform various other functions.

Figure 2:
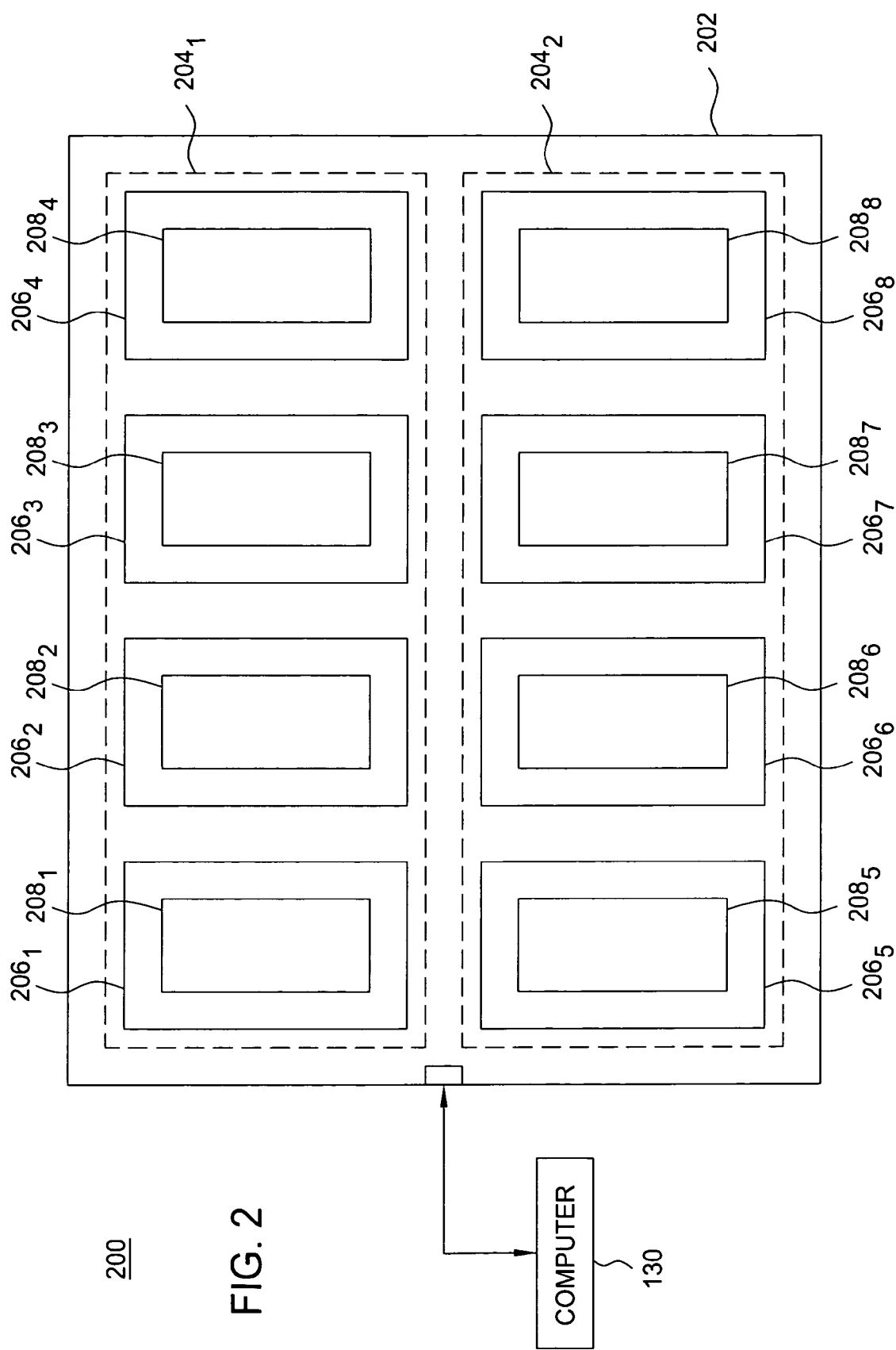
FIG. 2 depicts a high-level block diagram of a network element and computer of the communication network of FIG. 1.

FIG. 2 depicts a high-level block diagram of a network element and computer of the communication network of FIG. 1. More specifically, network element 112 of FIG. 2 includes a chassis 202 having a plurality of shelves $204_1$-$204_2$ (collectively, shelves 204). The shelves $204_1$ and $204_2$ include pluralities of slots $206_1$-$206_4$ and $206_5$-$206_8$ (collectively, slots 206), respectively. As depicted in FIG. 2, slots $206_1$-$206_8$ include a respective plurality of cards $208_1$-$208_8$ (collectively, cards 208) disposed within slots 206. Although not depicted, communications between various combinations of slots 206 and, therefore, the associated cards 208 disposed within slots 206, may be supported using backplane connections.

As depicted in FIG. 2, cards 208 may comprise various different card types adapted for performing various functions. As depicted in FIG. 2, cards $208_2$-$208_4$ and $208_6$-$208_8$ include traffic-carrying cards. For example, cards $208_2$-$208_4$ and $208_6$-$208_8$ may include optical transmission circuit packs. It will be appreciated that, where cards $208_2$-$208_4$ and $208_6$-$208_8$ are traffic-carrying cards, each of the cards $208_2$-$208_4$ and $208_6$-$208_8$ will include at least one port. As depicted in FIG. 2, cards $208_1$ and $208_5$ may include support cards. For example, cards $208_1$ and $208_5$ may include power cards, control cards, processor cards, and like cards adapted for supporting traffic-carrying cards (illustratively, cards $208_2$-$208_4$ and $208_6$-$208_8$).

As depicted in FIG. 2, computer 130 communicates with network element 112. In one embodiment, computer 130 and network element 112 may be geographically co-located. For example, computer 130 may be a system (e.g., element management system, network management system, and the like) in a central office in which network element 112 is deployed.

In another embodiment, computer 130 and network element 112 may be geographically distributed. For example, computer 130 may be a system in a network operations center responsible for managing one or more network elements 112 deployed in geographically distributed central offices.

In one embodiment, communication between modules disposed within each of the cards 208 may be performed using an embedded communication protocol. In one embodiment, communication between network element 112 and computer 130 and, specifically, between modules disposed within each of the cards 208 of network element 112 and computer 130, may be performed using an external communication protocol. A configuration supporting embedded communication between modules within one of cards of network element 112, and external communication between modules within one of the cards of network element 112 and computer 130, is depicted and described herein with respect to FIG. 3.

Figure 3:
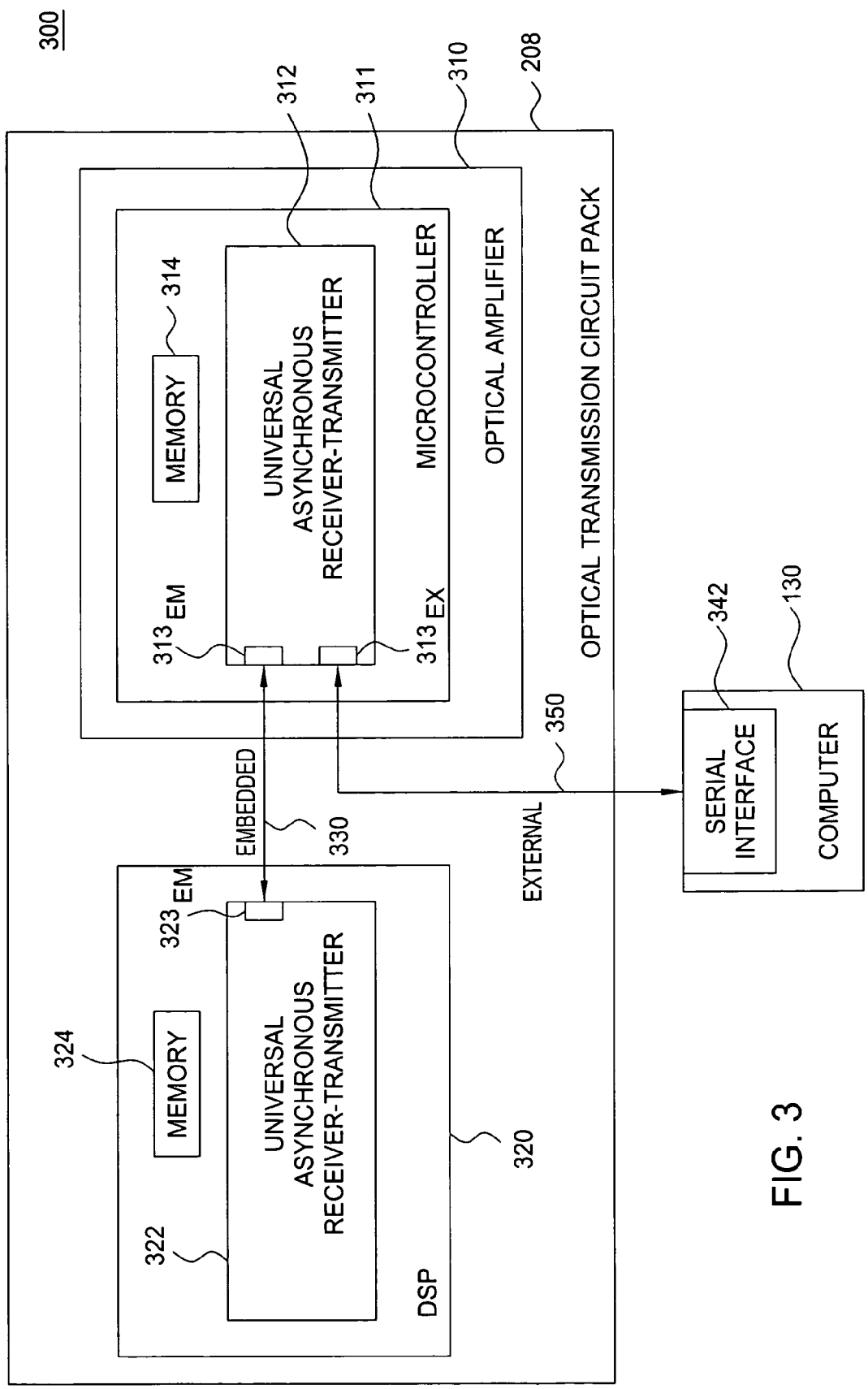
FIG. 3 depicts a high-level block diagram of an optical transmission circuit pack and a computer of the network element of FIG. 2.

FIG. 3 depicts a high-level block diagram of an optical transmission circuit pack and a computer of the network element of FIG. 2. As depicted in FIG. 3, OTCP 208 includes an optical amplifier (OA) 310 and a digital signal processor (DSP) 320. The OA 310 includes a microcontroller 311 having a universal asynchronous receiver-transmitter (UART) 312. The UART 312 includes an embedded communication interface (ECI) $313_{EM}$, an external communication interface (ECI) $313_{EX}$, and a memory 314. The DSP 320 includes a universal asynchronous receiver-transmitter (UART) 322 having an embedded communication interface (ECI) $323_{EM}$. The DSP 320 includes a memory 324.

Although depicted as comprising specific components coupled in a specific configuration, the specific components and component configurations may be implemented using various other components and associated component configurations. Furthermore, components may support various functions. In one embodiment, ECI $313_{EM}$, ECI $313_{EX}$, and ECI $323_{EM}$ may comprise serial communication interfaces, parallel communication interfaces, and the like. In one embodiment, memories 314 and 324 comprise non-volatile memories (e.g., random access memory (RAM, Electrically-Erasable Programmable Read-Only Memory (EEPROM), and the like). As such, the present invention is not intended to be limited by the functionality supported by the various embedded and external components communicating using various embodiments of the present invention.

As depicted in FIG. 3, OTCP 208 includes embedded components. In general, an embedded component is a computer system (e.g., hardware and, often, associated software) which is completely encapsulated by a device controlled by the computer system. For example, an embedded component may be programmed hardware configured for various applications, programmable firmware configurable for various applications, and the like, as well as various combinations thereof. As depicted in FIG. 3, OA 310 and DSP 320 operate as embedded components (embedded within OTCP 208), and, similarly, microcontroller 311 operates as an embedded component (embedded within OA 310). As described herein, embedded components communicate (with other embedded components) using embedded protocols.

As depicted in FIG. 3, computer 130 is an external component. As depicted in FIG. 3, computer 130 includes a serial interface (SI) 342. As depicted in FIG. 3, SI 342 interfaces with UART 314 of OA 310 for exchanging messages with microcontroller 311 of OA 310. Although not depicted in FIG. 3, computer 130 may include processors (e.g., a central processing unit, a microcontroller, and the like), memory components (e.g., random access memory (RAM), read only memory (ROM), and the like), and various input/output devices (e.g., a receiver, a transmitter, user interaction devices (keyboard, a keypad, a mouse, and the like)), and the like, as well as various combinations thereof.

As described herein, external components communicate (with embedded components, as well as other external components) using external protocols. In one embodiment, messages may be exchanged between an external component (e.g., computer 130) and embedded components (e.g., microcontroller 311 of OA 310 and DSP 320 of OTCP 208) using various applications (e.g., TELNET, File Transfer Protocol (FTP), and the like). For example, computer 130 may include TELNET software, Secure Shell (SSH) software, and like applications supporting ASCII terminal dialogues. After computer 130 establishes a session (e.g., TELNET, SSH, and the like) with OTCP 208, various functions (e.g., configuring parameters on OA 310, configuring parameters on DSP 320, and the like) may be performed using messages, commands, and the like.

Although described with respect to specific modules (illustratively, OA 310 and DSP 320) adapted for performing specific functions, OTCP 208 may include various other modules adapted for performing other functions required for supporting optical transmissions. Similarly, although described with respect to performing specific functions, functions supported by computer 130 may include any functions (including machine-initiated actions and user-initiated actions) performable by any computer, such as database modifications, file maintenance, and the like. As such, the present invention is not intended to be limited by the modules (and associated module configurations), or associated functions, of the embedded components and external components, as depicted and described herein.

As depicted in FIG. 3, OA 310 (using UART 312 and, specifically, using ECI $313_{EM}$) and DSP 320 (using UART 322 and, specifically, using ECI $323_{EM}$) communicate over a communication path 330 using an embedded communication protocol (denoted as EMBEDDED). In one embodiment, an embedded communication protocol comprises a communication protocol facilitating communications between embedded components. In one embodiment, an embedded communication protocol may include any communication protocol utilizing simple codes (e.g., utilizing numbers rather than a string of ASCII characters).

As depicted in FIG. 3, OA 310 (using UART 312 and, specifically, using ECI $313_{EX}$) and computer 130 (using SI 342) communicate over a communication path 350 using an external communication protocol (denoted as EXTERNAL). In one embodiment, an external communication protocol comprises a communication protocol facilitating communications between an embedded component and an external component (or, although not depicted, between external components). For example, an external communication protocol may include one of an ASCII-based protocol, a UCS-based protocol, and the like.

Although depict and described with respect to FIG. 3 as having two interfaces (illustratively, ECI $313_{EM}$ between UART 312 and UART 322 and ECI $313_{EX}$ between UART 312 and computer 130), in one embodiment, UART 312 may be implemented using a single interface for communicating with both UART 322 and computer 130. In one such embodiment, interfaces ECI $313_{EM}$ and ECI $313_{EX}$ may be implemented as a single interface. In this embodiment, during normal operation of OTCP 208, communication path 330 is utilized for conveying messages exchanged between UART 312 and UART 322. In this embodiment, during management operation of OTCP 208 using computer 130 (e.g., for performing maintenance operations initiated from computer 130), communication path 350 is utilized for conveying messages exchanged between UART 312 and computer 130.

As depicted in FIG. 3, OA 310 may propagate information (e.g., messages, commands, data, and the like) toward an embedded component (illustratively, DSP 320) using an embedded communication protocol. In one embodiment, information propagated from OA 310 to DSP 320 originates in OA 310. In one embodiment, information propagated from OA 310 to DSP 320 originates in another component. In one such embodiment, OA 310 may receive the information from another embedded component (not depicted) using an embedded communication protocol. In another such embodiment, OA 310 may receive the information from an external component (illustratively, computer 130) using an external communication protocol.

As depicted in FIG. 3, OA 310 may propagate information (e.g., messages, commands, data, and the like) toward an external component (illustratively, computer 130) using an external communication protocol. In one embodiment, information propagated from OA 310 to computer 130 originates in OA 310. In one embodiment, information propagated from OA 310 to computer 130 originates in another component. In one such embodiment, OA 310 may receive the information from an embedded component (illustratively, DSP 320) using an embedded communication protocol. In another such embodiment, OA 310 may receive the information from another external component (not depicted) using an external communication protocol.

As depicted in FIG. 3, UARTs 312 and 322 are adapted for exchanging information using embedded protocols, external protocols, and the like. In general, UARTs are operable for translating between serial data and parallel data. For example, UART 312 may translate a serial data stream received from SI 342 of computer 130 into a corresponding parallel data stream (e.g., for processing within microcontroller 311, propagation to at least one other component, and the like). For example, UART may translate a parallel data stream into a corresponding serial data stream for propagation toward another module (e.g., SI 342 of computer 130, UART 322 of DSP 320, and the like). In general, UARTs may be built into various computer components (e.g., digital signal processing modules, microcontrollers, and the like). For example, as depicted and described with respect to FIG. 3, UARTs 312 and 322 are disposed within microcontroller 311 and DSP 320, respectively).

In one embodiment, UARTs 312 and 322 may directly generate/receive at least a portion of the voltages applied to module interconnections (e.g., wires interconnecting OA 310, DSP 320, and computer 130). In another embodiment, in which UARTs 312 and 322 do not directly generate/receive voltages applied to the wires interconnecting OA 310, DSP 320, and computer 130, UARTs 312 and 322 may utilize interface standards (e.g., RS 232, RS 422, RS 485, and the like) for defining voltage levels and other characteristics of the interconnection. Although depicted and described herein as UARTs, in one embodiment, at least one of UART 312 and UART 322 may be implemented as a Universal Synchronous Asynchronous Receiver-Transmitter (USART) supporting synchronous as well as asynchronous communications.

As depicted in FIG. 3, microcontroller 311 is operable for performing at least a portion of the functions of the present invention. In one embodiment, microcontroller 311 is operable for receiving a message formed according to one of an embedded communication protocol and an external communication protocol, and using a portion of the received message for identifying the communication protocol associated with the received message. The microcontroller 311 processes the received message using the identified communication protocol. Although described herein as being performed by a microcontroller, the present invention may be performed by various other components (e.g., microprocessors, digital signal processors, and like components, including both embedded and external components) for supporting improving communications between components utilizing differing communication protocols. A method for switching between communication protocols is depicted and described herein with respect to FIG. 4.

Figure 4:
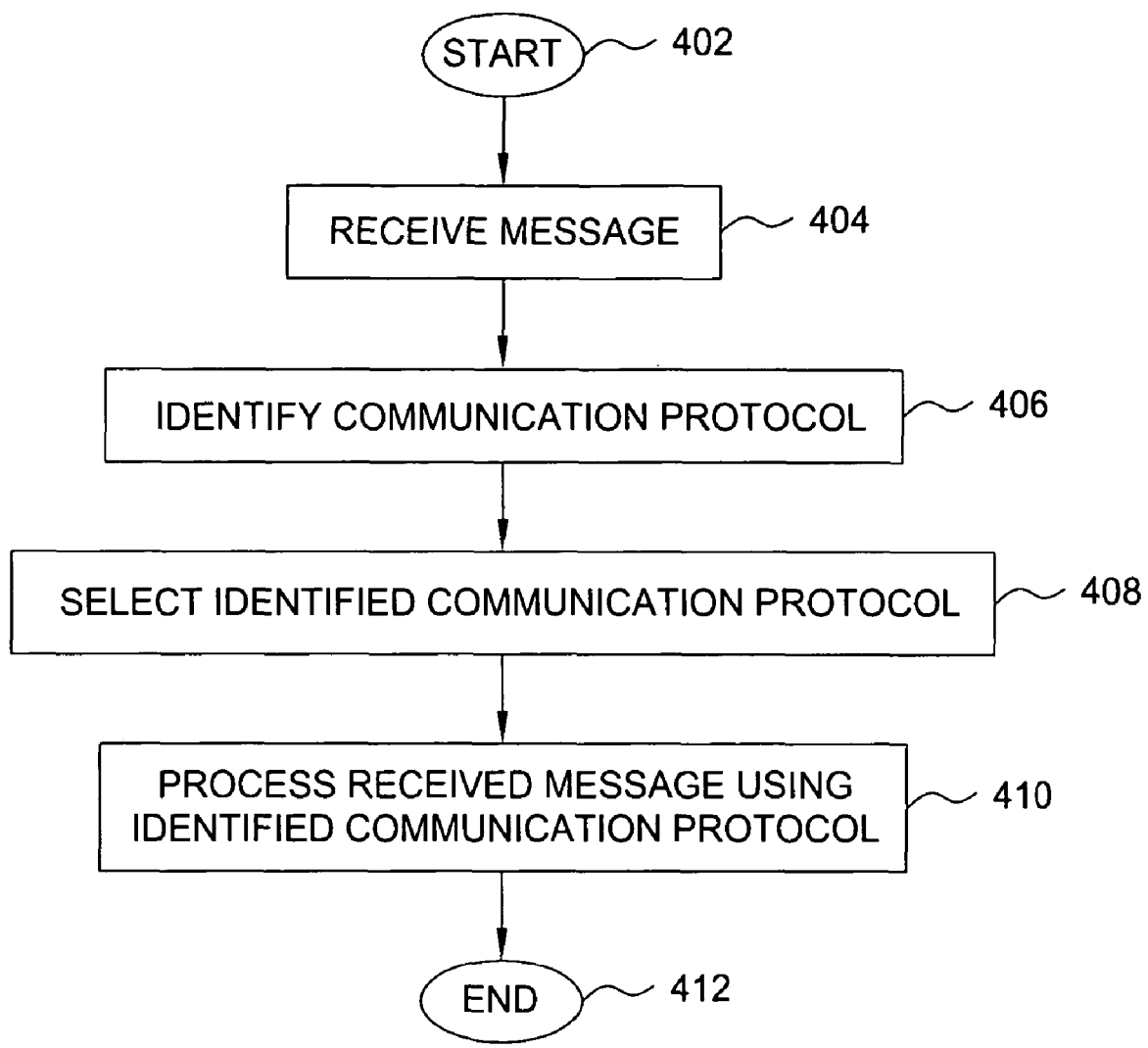
FIG. 4 depicts a method according to one embodiment of the present invention.

FIG. 4 depicts a method according to one embodiment of the present invention. Specifically, method 400 of FIG. 4 comprises a method for identifying and, if required, selecting, a communication protocol required for processing a received message, thereby obviating any need for use of explicit messages or dedicated message overhead for identifying and selecting communication protocols. Although depicted as being performed serially, those skilled in the art will appreciate that at least a portion of the steps of method 400 may be performed contemporaneously, or in a different order than presented in FIG. 4. The method 400 begins at step 402 and proceeds to step 404.

At step 404, a message is received. In one embodiment, the message comprises a command. The message may be associated with (i.e., formed, conveyed, and processed using) one of a plurality of communication protocols (e.g., an embedded communication protocol, an external communication protocol, and the like). In one embodiment, information adapted for identifying the communication protocol of the received message is included within the received message. In one embodiment, information adapted for identifying the communication protocol includes information processed using the identified communication protocol (i.e., the information adapted for identifying the communication protocol is not a header). An exemplary message format is depicted and described herein with respect to FIG. 5.

At step 406, a communication protocol is identified by processing a portion of the received message. In one embodiment, the portion of the received message processed for identifying the communication protocol may include the lower nibble of the first byte of the message. In one embodiment, the portion of the message processed for identifying the communication protocol may include the lower nibble of the first byte of a four-byte message (i.e., bits 25 through 27 where the least significant bit of the first byte is bit 24 and the most significant bit of the first byte is bit 31). An exemplary message formatted according to one variation of this embodiment is depicted and described herein with respect to FIG. 5.

In one such embodiment, messages may be assembled in which the first byte of the message (or the lower nibble of the first byte of the message) operates as the selector for the determining the communication protocol with which the received message is associated. For example, in a communication system using an embedded communication protocol in which the lower nibble of the first byte has three unused bit positions and an ASCII communication protocol in which the first byte includes the first character of a command to be processed (e.g., "V" in the ASCII "VER" command), considering all possible combinations of bit combinations which may appear in the lower nibble of the first byte of messages of the ASCII communication protocol, at least one bit combination which cannot appear in the lower nibble of the first byte of messages of the ASCII communication protocol may be identified and used for selecting identifying messages of the embedded communication protocol.

In one such embodiment, for example, a code of "101" in the lower nibble of the first byte may identify the embedded communication protocol and a code different than "101" in the lower nibble of the first byte (e.g., 000, 010, and the like; i.e., codes associated with the valid first letters of commands in the ASCII communication protocol, such as "V" in the ASCII "VER" command) may identify the ASCII communication protocol. In one embodiment, in which two or more communication protocols are supported, each code identifies a different communication protocol. In one such embodiment, for example, a code of "101" may identify a first embedded communication protocol, a code of "010" may identify a second embedded communication protocol, and other codes may identify an ASCII communication protocol.

At step 408, the identified communication protocol is selected. In one embodiment, the identified communication protocol is a protocol operable for processing the received message. As described herein, the information used for identifying and selecting the communication protocol is embedded within the actual message such that at least a portion of the message serves two functions (i.e., identification and selection of the communication protocol and conveying information to be processed using the identified and selected protocol). In one embodiment, selection of the identified communication protocol comprises switching between communication protocols (i.e., between a currently selected communication protocol and the identified communication protocol). In one embodiment, selection of the identified communication protocol comprises selection of the identified communication protocol from one of a plurality of available communication protocols.

In one embodiment, components performing the present invention maintain a currently selected communication protocol. In one embodiment, the currently selected communication protocol is a communication protocol associated with a previously processed message (i.e., the last message processed by the component). In this embodiment, a currently received message (i.e., the next message received by the component) is processed for identifying a communication protocol associated with the currently received message. In this embodiment, a determination is made as to whether the currently selected communication protocol maintained by the component matches the identified communication protocol associated with the currently received message.

In one such embodiment, if the currently selected communication protocol maintained by the component and the identified communication protocol match, the currently selected communication protocol is maintained for processing the currently received message (i.e., an explicit switch to the identified communication protocol is not performed). In one such embodiment, if the currently selected communication protocol maintained by the component and the identified communication protocol do not match, the identified communication protocol associated with the currently received message is set as the currently selected communication protocol for processing the currently received message (i.e., a switch from selection of the currently selected communication protocol to selection of the identified communication protocol is performed).

In one embodiment, if the previous received message resulted in use of the embedded communication protocol, and processing of the current received message results in identification of the embedded communication protocol, selection of the embedded communication protocol is maintained (e.g., an explicit switch to the embedded communication protocol is not performed) for processing the current received message. In one embodiment, if the previous received message resulted in use of an embedded communication protocol, and processing of the current received message results in identification of an external communication protocol, the external communication protocol is selected for processing the current received message (e.g., an explicit switch to the external communication protocol is performed).

In one embodiment, if the previous received message resulted in use of the external communication protocol, and processing of the current received message results in identification of the external communication protocol, selection of the external communication protocol is maintained (e.g., an explicit switch to the embedded communication protocol is not performed) for processing the current received message. In one embodiment, if the previous received message resulted in use of the external communication protocol, and processing of the current received message results in identification of the embedded communication protocol, the embedded communication protocol is selected for processing the current received message (e.g., an explicit switch to the embedded communication protocol is performed).

At step 410, the received message is processed. In one embodiment, a portion of the received message is processed. In one embodiment, the received message is processed using the identified communication protocol. In one embodiment, as described herein, the information included with the message for selecting the associated communication protocol is embedded within the message such that at least a portion of the message serves two functions (i.e., selection of the communication protocol and conveying information to be processed using the selected protocol). For example, in one embodiment, in which the portion of the received message processed for identifying the communication protocol includes the lower nibble of the first byte of a four-byte message, the identified communication protocol may be used for processing the first, second, third, and fourth bytes of the message. An example of a received message (specifically, a four-byte message) is depicted and described herein with respect to FIG. 5.

Figure 5:
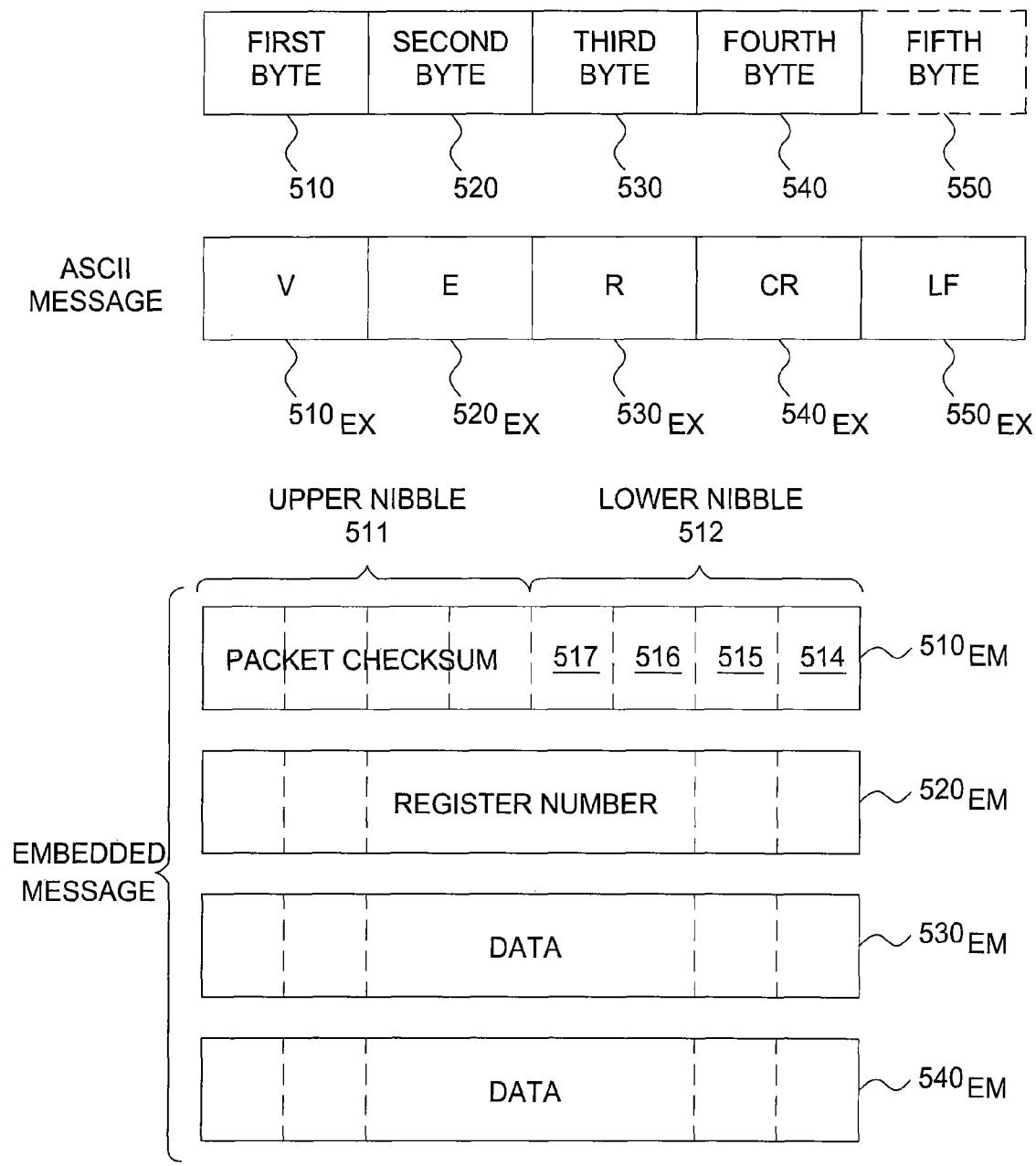
FIG. 5 depicts an example of a message format supported by one embodiment of the present invention.

FIG. 5 depicts an example of a message format supported by a communication protocol of one embodiment of the present invention. As depicted in FIG. 5, message 500 comprises a four-byte packet including a first byte 510, a second byte 520, a third byte 530, a fourth byte 540, and, optionally (for embedded messages of other lengths or variable length ASCII messages), a fifth byte 550. In FIG. 5, an exemplary ASCII message having the message format of message 500 is depicted and an exemplary embedded message having the message format of message 500 is depicted. In one embodiment, corresponding portions (e.g., lower nibble) of first byte $510_{EX}$ of the exemplary ASCII message and first byte $510_{EM}$ of the exemplary embedded message may be used, by a component adapted for receiving both message formats, for identifying the communication protocol (i.e., message formats) associated with each received message.

As depicted in FIG. 5, with respect to the exemplary ASCII message, first byte 510 is represented as first byte $510_{EX}$ (illustratively, ASCII letter "V"), second byte 520 is represented as second byte $520_{EX}$ (illustratively, ASCII letter "E"), third byte 530 is represented as third byte $530_{EX}$ (illustratively, ASCII letter "R"), fourth byte 540 is represented as fourth byte $540_{EX}$ (illustratively, ASCII "CR"), and fifth byte 550 is represented as fifth byte $550_{EX}$ (illustratively, ASCII "LF"). For purposes of clarity, only five bytes of the ASCII message are depicted and described herein with respect to FIG. 5, however, In ASCII communication, message length is not restricted to five bytes. In one embodiment, a portion of first byte $510_{EX}$ may be processed for identifying the communication protocol required for processing each of the five bytes of ASCII message $500_{EX}$ (i.e., the information required for identifying the protocol is encoded within the information of the message itself).

As depicted in FIG. 5, with respect to the exemplary embedded message, first byte 510 is represented as first byte $510_{EM}$, second byte 520 is represented as second byte $520_{EM}$, third byte 530 is represented as third byte $530_{EM}$, and fourth byte 540 is represented as fourth byte $540_{EM}$. The first byte $510_{EM}$ includes an upper nibble 511 (i.e., the four most significant bits of first byte $510_{EM}$) and a lower nibble 512 (i.e., the four least significant bits of first byte $510_{EM}$). The upper nibble 511 includes four bits reserved for use by the transport layer (e.g., packet checksum is added). The lower nibble 512 includes four bits including a message operation bit 514 (i.e., least significant bit of lower nibble 512), a first protocol identification bit 515, a second protocol identification bit 516, and a third protocol identification bit 517 (i.e., most significant bit of lower nibble 512).

In one embodiment, first, second, and third protocol identification bits 515, 516, and 517 may be processed for identifying the communication protocol of the message. In this embodiment, first, second, and third protocol identification bits 515, 516, and 517 form a first portion of embedded message $500_{EM}$ that may be processed for identifying a communication protocol required for processing embedded message $500_{EM}$. As depicted in FIG. 5, the remainder of embedded message $500_{EM}$ (i.e., the packet checksum bits of the first byte $510_{EM}$, message operation bit 514 of first byte $510_{EM}$, second byte $520_{EM}$, third byte $530_{EM}$, and fourth byte $540_{EM}$) forms the second portion of embedded message $500_{EM}$. Using the identified communication protocol, the first and second portions of embedded message $500_{EM}$ may be processed for performing various functions. As such, first byte $510_{EM}$ includes information for identifying a protocol for processing first byte $510_{EM}$.

As depicted in FIG. 5, message operation bit 514 identifies one or more operations associated with embedded message $500_{EM}$ (e.g., operations such as READ operations, WRITE operations, and the like, as well as various combinations thereof). As depicted in FIG. 5, second byte $520_{EM}$ includes a register number identifying a memory location on which the operation(s) defined by command operation bit 514 is performed. For example, a READ operation may be performed for reading information stored in the register identified in the second byte $520_{EM}$, a WRITE operation may be performed for writing information to the register identified in the second byte $520_{EM}$, and like operations may be performed depending on the protocol used, the associated command set supported by that protocol, and like factors, as well as various combinations thereof. As depicted in FIG. 5, third byte $530_{EM}$ and fourth byte $540_{EM}$ include data. For example, third byte $530_{EM}$ and fourth byte $540_{EM}$ may include data for storage in the register identified in second byte $520_{EM}$ in response to a READ command encoded in message operation bit 514.

In one embodiment, information included within messages for enabling switching between communication protocols is determined by analyzing similarities and differences in various characteristics of the different message sets supported by the communication protocols. For example, in one embodiment, in which a first communication protocol utilizes the first n bytes of a message for identifying a message type (e.g., a specific command to be processed), analysis of the entire command set of the first communication protocol may result in a determination that the first byte may only include a limited set of characters (e.g., {B, R, S, V}).

In continuation of this example, in one embodiment, in which a second communication protocol utilizes the first n bytes of a message for identifying a message type (e.g., a specific command to be processed), analysis of the entire command set of the first communication protocol may result in a determination that the first byte may only include a limited set of characters. In one such embodiment, in which the sets of characters which may be used as the first byte in commands from the respective command sets of the first and second communication protocols are mutually exclusive (e.g., the first byte of messages in the second communication protocol may only include characters from the set {C, D, F, L, N}), identification of this mutual exclusivity may be utilized for switching between the first and second communication protocols.

In continuation of this example, in another embodiment, in which a second communication protocol includes unused bit positions, the unused bit positions in messages of the second communication protocol may be set in a manner for enabling switching between the first and second communication protocols. For example, the second communication protocol may include an embedded communication protocol in which at least a portion of the bits of the first byte of each message comprise unused bit positions. The identification of the unused bit positions in messages of the second communication protocol, and identification of values mutually exclusive to the possible values included within the corresponding bit positions of the first protocol, may be utilized for switching between the first and second communication protocols.

In such embodiments, by identifying mutually exclusive sets of values for inclusion in corresponding bit positions of different communication protocols switching between the communication protocols may be achieved without requiring explicit messages or explicit overhead within the messages of the communication protocols for switching between the communication protocols. In other words, depending on the communication protocol, at least a portion of the information included within messages of the communication protocol (i.e., information processed, using the communication protocol, for performing some operation (e.g., a portion of a command name)) is actually also used for selecting the communication protocol required for processing the message.

Although primarily depicted and described herein with respect to serial communications, in one embodiment, the present invention may be utilized for improving parallel communications. Furthermore, although depicted and described herein using a specific message size, message format, and like message attributes, messages associated with communication protocols supported by different embodiments of the present invention may be implemented using other message sizes, message formats, and like message attributes. Although depicted and described herein as including specific information in specific locations within a message, different information may be included within a message, information conveyed by the message may be distributed across the message in a different manner, and the like. As such, the present invention is not limited by the communication protocols supported, or the message formats associated with the messages exchanged according to the supported communication protocols.

Although depicted and described herein as using a first message portion for identifying a communication protocol for processing the entire message, various other message portion combinations may be utilized. For example, a first message portion may be used for identifying a communication protocol for processing a second message portion, a plurality of first message portions may be used for identifying a communication protocol for processing a second message portion, a plurality of first message portions may be used for identifying a communication protocol for processing a plurality of second message portions, and the like. Furthermore, one or more first message portions may be used for identifying a plurality of communication protocols required for processing one or more second message portions.

In one embodiment, an embedded communication protocol enables intra-module communication (i.e., between internal components within a module). In one embodiment, an external communication protocol enables inter-module communication (i.e., between modules). Although described herein with respect to a specific module scope, the module scope may vary across different embodiments of the present invention. As such, embedded communication protocols used for embedded communications and external communication protocols used for external communications may vary across implementations of the present invention.

In one embodiment, a module corresponds to a network element (e.g., one of the optical switches depicted and described herein with respect to FIG. 1). In one such embodiment, for example, each circuit pack (e.g., optical transmission circuit packs 208 depicted and described herein with respect to FIG. 2) comprises an internal component of the module, and communication between circuit packs comprises intra-module communication performed using an embedded protocol (i.e., embedded within the module). In this embodiment, for example, a computer (e.g., a management system) in communication with the network element comprises an external component and communication between the network element and the computer comprises inter-module communication performed using an external protocol.

In one embodiment, a module corresponds to a circuit pack (e.g., one of the optical transmission circuit packs 208 depicted and described herein with respect to FIG. 2). In one such embodiment, for example, each packet component (e.g., OA 310 and DSP 320 depicted and described herein with respect to FIG. 3) comprises an internal component of the module, and communication between components comprises intra-module communication performed using an embedded protocol (i.e., embedded within the circuit pack). In this embodiment, for example, a computer (e.g., a management system) in communication with the circuit packs comprises an external component and communication between the network element and the computer comprises inter-module communication performed using an external protocol.

Figure 6:
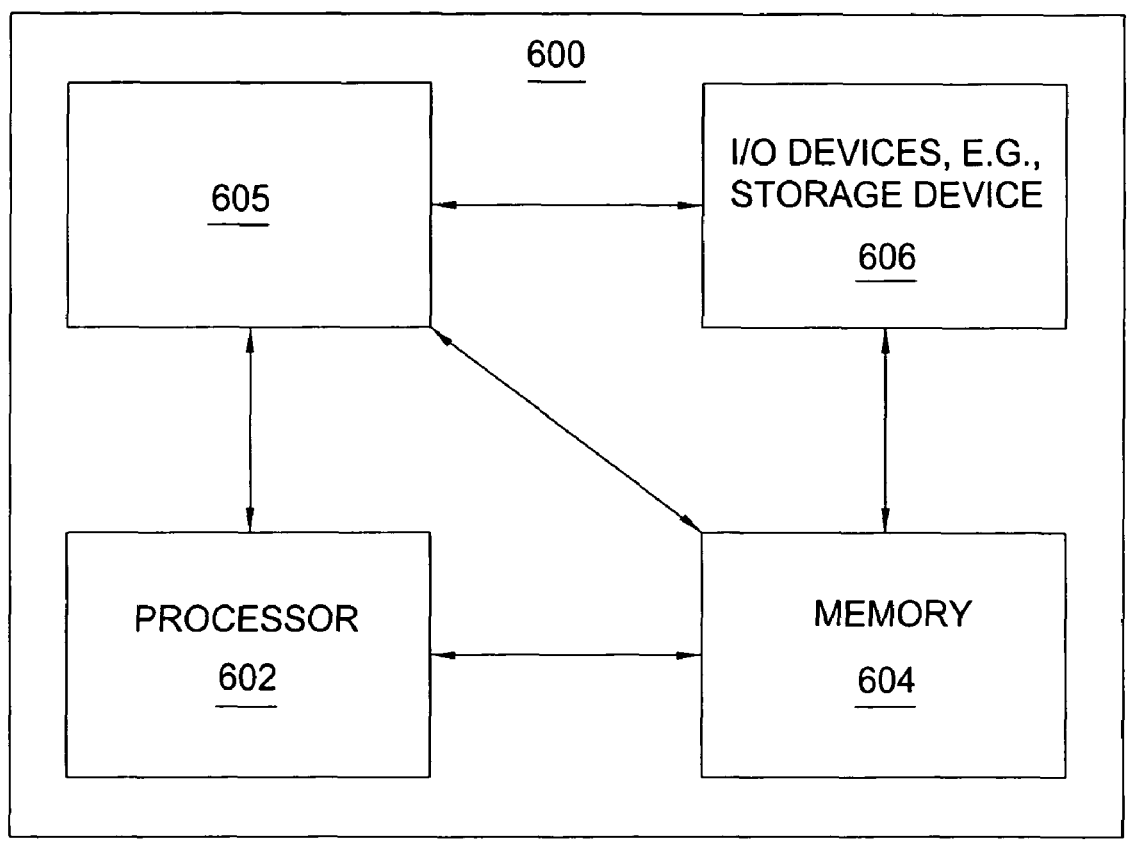
FIG. 6 depicts a high-level block diagram of a general-purpose computer suitable for use in performing the functions described herein.

FIG. 6 depicts a high-level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a communication protocol identification module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present communication protocol identification module or process 605 can be loaded into memory 604 and executed by processor 602 to implement the functions as discussed herein. As such, communication protocol identification process 605 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for processing a message at a system comprising a first embedded component and a second embedded component, the method comprising:
 receiving a message at the first embedded component;
  wherein the first embedded component is configured for communicating with the second embedded component using an embedded protocol and for communicating with an external component using an external protocol, wherein the message is received from the second embedded component or the external component;
  wherein the first embedded component is configured for communicating using only one selected protocol at any given time, wherein the selected protocol via which the first embedded component communicates is selected by the first embedded component from a plurality of protocols, wherein the plurality of protocols available for use as the selected protocol comprises the embedded protocol and the external protocol;
 processing a portion of the received message to identify the protocol of the received message, wherein the protocol of the received message is identified as the embedded protocol or the external protocol;
 when the identified protocol of the received message is the same as the selected protocol of the first embedded component when the message is received, processing the received message using the identified protocol; and
 when the identified protocol of the received message is different than the selected protocol of the first embedded component when the message is received, switching the selected protocol of the first embedded component to the identified protocol and processing the received message using the identified protocol.

2. The method of claim 1, wherein identifying the protocol comprises:
 identifying the protocol as the embedded protocol in response to a determination that the message portion comprises a first value from a first set of values; or
 identifying the protocol as the external protocol in response to a determination that the message portion comprises a second value from a second set of values;
 wherein the first and second sets of values comprise mutually exclusive values.

3. The method of claim 1, wherein the first embedded component comprises a first universal asynchronous receiver-transmitter (UART) and the second embedded component comprises a second universal asynchronous receiver-transmitter (UART).

4. The method of claim 1, wherein the first and second embedded components are micro-controllers and the external component is a communications node.

5. The method of claim 1, wherein the embedded protocol comprises a binary protocol and the external protocol comprises an ASCII protocol.

6. The method of claim 1, wherein processing the portion of the received message comprises:
 identifying the portion of the received message; and
 identifying the protocol of the received message using a value of the portion of the received message.

7. The method of claim 1, wherein the first embedded component forms part of an optical amplifier (OA) and the second embedded component forms part of a digital signal processor (DSP).

8. The method of claim 1, wherein the portion of the received message is a lower nibble of a first byte of the received message.

9. The method of claim 1, wherein the first embedded component processes the portion of the received message for identifying the protocol of the received message.

10. An apparatus, comprising:
 a first embedded component including a processor capable of executing computer-executable instructions and a second embedded component;
 wherein the first embedded component is configured for communicating with the second embedded component using an embedded protocol and for communicating with an external component using an external protocol;
 wherein the first embedded component is configured for communicating using only one selected protocol at any given time, wherein the selected protocol via which the first embedded component communicates is selected by the first embedded component from a plurality of protocols, wherein the plurality of protocols available for use as the selected protocol comprises the embedded protocol and the external protocol;
 wherein the first embedded component is configured for receiving a message, processing a portion of the received message to identify a protocol of the received message, and processing the received message using the identified protocol;
 when the identified protocol of the received message is the same as the selected protocol of the first embedded component when the message is received, processing the received message using the identified protocol; and
 when the identified protocol of the received message is different than the selected protocol of the first embedded component when the message is received, switching the selected protocol of the first embedded component to the identified protocol and processing the received message using the identified protocol.

11. The apparatus of claim 10, wherein the first embedded component is configured for processing the portion of the received message by:
 identifying the portion of the received message; and
 identifying the protocol of the received message using a value of the portion of the received message.

12. The apparatus of claim 10, wherein first embedded component is configured for processing the portion of the received message by:
 identifying the protocol as the embedded protocol in response to a determination that the message portion comprises a first value from a first set of values; or
 identifying the protocol as the external protocol in response to a determination that the message portion comprises a second value from a second set of values;
 wherein the first and second sets of values comprise mutually exclusive values.

13. The apparatus of claim 10, wherein the first embedded component comprises a first universal asynchronous receiver-transmitter (UART) and the second embedded component comprises a second universal asynchronous receiver-transmitter (UART).

14. The apparatus of claim 10, wherein the first embedded component forms part of an optical amplifier (OA) and the second embedded component forms part of a digital signal processor (DSP).

15. The apparatus of claim 10, wherein the first and second embedded components are micro-controllers and the external component is a communications node.

16. The apparatus of claim 10, wherein the portion of the received message is a lower nibble of a first byte of the received message.

17. The apparatus of claim 10, wherein the embedded protocol comprises a binary communication protocol and the external protocol comprises an ASCII communication protocol.

* * * * *